United States Patent
Klingeberg et al.

(10) Patent No.: US 11,466,177 B2
(45) Date of Patent: Oct. 11, 2022

(54) MOISTURE-CURABLE ADHESIVE TAPE AND METHOD FOR JACKETING ELONGATED ITEMS, ESPECIALLY LEADS

(71) Applicant: TESA SE, Norderstedt (DE)

(72) Inventors: Kerstin Klingeberg, Hamburg (DE); Heike Simonis, Hamburg (DE); Lars Gulbrandsen, Barsbüttel (DE); Marco Kupsky, Quickborn (DE); Patrick Kerep, Hamburg (DE)

(73) Assignee: TESA SE, Norderstedt (DE)

( * ) Notice: Subject to any disclaimer, the term of this patent is extended or adjusted under 35 U.S.C. 154(b) by 36 days.

(21) Appl. No.: 16/785,327

(22) Filed: Feb. 7, 2020

(65) Prior Publication Data
US 2020/0255695 A1    Aug. 13, 2020

(51) Int. Cl.
*C09J 7/21* (2018.01)
*C09J 7/38* (2018.01)
(Continued)

(52) U.S. Cl.
CPC .................. *C09J 7/21* (2018.01); *C09J 7/385* (2018.01); *C09J 175/12* (2013.01);
(Continued)

(58) Field of Classification Search
CPC ......................................................... C09J 7/21
See application file for complete search history.

(56) References Cited

U.S. PATENT DOCUMENTS

| | | | |
|---|---|---|---|
| 3,018,262 A | 1/1962 | Schroeder et al. | |
| 3,117,099 A | 1/1964 | Proops et al. | |

(Continued)

FOREIGN PATENT DOCUMENTS

| | | |
|---|---|---|
| CN | 103298661 A | 9/2013 |
| CN | 104299726 A | 1/2015 |

(Continued)

OTHER PUBLICATIONS

DE Office Action issued in corresponding application DE 10 2019 103 122.2 dated Oct. 9, 2019.

(Continued)

*Primary Examiner* — Daniel H Lee
(74) *Attorney, Agent, or Firm* — Norris McLaughlin PA

(57) ABSTRACT

The present invention relates to an adhesive tape and to a method for jacketing an elongated item, more particularly cable sets. The adhesive tape must cure within the operational dictates for further processing, e.g. within 6 min, and after curing must exhibit the required dimensional stability properties. However, the adhesive compositions must not cure during storage itself, since otherwise they can no longer be used. Nor may the curing temperatures be too high, since otherwise the lead insulation, which is often made of PVC, may suffer damage. The invention proposes a method for jacketing an elongated item such as more particularly leads or cable sets, where a tape which comprises a moisture-curing binder on a carrier is first impregnated with water and immediately thereafter is guided in a helical line around the elongated item or the elongated item is wrapped in an axial direction by the adhesive tape, the elongated item together with the adhesive tape wrapping is brought into the desired disposition, more particularly into the cable set plan, the elongated item is held in this disposition, while the curable adhesive cures. Alternatively proposed is a method for jacketing an elongated item such as more particularly leads or cable sets, where a tape which comprises a moisture-curing binder on a carrier is guided in a helical line around the elongated item or the elongated item is wrapped in an axial direction by the adhesive tape, the elongated item together with the adhesive tape wrapping is brought into the desired disposition, more particularly into the cable set plan, (Continued)

the elongated item is held in this disposition, and the curable adhesive is brought to cure by the supply of moisture.

11 Claims, 1 Drawing Sheet

(51) Int. Cl.
  *C09J 175/12* (2006.01)
  *H01B 13/012* (2006.01)
  *C08G 18/10* (2006.01)

(52) U.S. Cl.
  CPC ....... *H01B 13/01281* (2013.01); *C08G 18/10* (2013.01); *C09J 2203/302* (2013.01); *C09J 2400/26* (2013.01)

(56) References Cited

U.S. PATENT DOCUMENTS

| | | | |
|---|---|---|---|
| 3,741,769 | A | 3/1973 | Smith |
| 3,729,313 | A | 4/1973 | Smith |
| 4,058,401 | A | 11/1977 | Crivello |
| 4,131,114 | A | 12/1978 | Kirkpatrick et al. |
| 4,138,255 | A | 2/1979 | Crivello |
| 4,231,951 | A | 11/1980 | Olofson et al. |
| 4,250,053 | A | 2/1981 | Smith |
| 4,256,828 | A | 3/1981 | Smith |
| 4,322,516 | A | 3/1982 | Lieb et al. |
| 4,376,438 | A | 3/1983 | Straube et al. |
| 4,394,403 | A | 7/1983 | Smith |
| 4,411,262 | A | 10/1983 | von Bonin et al. |
| 4,433,680 | A | 2/1984 | Yoon |
| 4,502,479 | A | 3/1985 | Garwood et al. |
| 4,622,260 | A | 11/1986 | Tesch |
| 4,667,661 | A | 5/1987 | Scholz et al. |
| 4,831,077 | A | 5/1989 | Ball et al. |
| 4,881,995 | A | 11/1989 | Arenz |
| 5,804,510 | A | 9/1998 | Spies et al. |
| 5,944,674 | A | 8/1999 | Richard et al. |
| 6,005,191 | A | 12/1999 | Mitchell |
| 6,595,938 | B1 | 7/2003 | Delmore et al. |
| 6,908,722 | B2 | 6/2005 | Ebata et al. |
| 7,279,541 | B2 | 10/2007 | Centner et al. |
| 7,851,542 | B2 | 12/2010 | Michl et al. |
| 9,613,733 | B2 | 4/2017 | Siebert et al. |
| 9,725,622 | B2 | 8/2017 | Korthals et al. |
| 10,519,344 | B2 | 12/2019 | Korthals et al. |
| 10,519,345 | B2 | 12/2019 | Korthals et al. |
| 2002/0182955 | A1 | 12/2002 | Ngo et al. |
| 2004/0097638 | A1 | 5/2004 | Centner et al. |
| 2004/0253889 | A1 | 12/2004 | Mundt |
| 2005/0004309 | A1 | 1/2005 | Gerst et al. |
| 2005/0271868 | A1 | 12/2005 | Myhre et al. |
| 2010/0063221 | A1 | 3/2010 | Hori et al. |
| 2012/0279637 | A1 | 11/2012 | Siebert et al. |
| 2012/0279755 | A1 | 11/2012 | Korthals et al. |
| 2012/0282836 | A1 | 11/2012 | Korthals et al. |
| 2012/0282837 | A1 | 11/2012 | Korthals et al. |
| 2013/0277106 | A1* | 10/2013 | Toyama ............... H01B 13/012 174/72 A |
| 2014/0044960 | A1 | 2/2014 | Gunzler et al. |
| 2015/0013874 | A1* | 1/2015 | Siebert ................. C09J 7/21 156/52 |
| 2015/0013875 | A1 | 1/2015 | Siebert et al. |
| 2015/0380126 | A1 | 12/2015 | Specht et al. |
| 2016/0032150 | A1 | 2/2016 | Gunzler et al. |
| 2016/0326413 | A1 | 11/2016 | Schuh et al. |
| 2016/0333229 | A1 | 11/2016 | Korthals et al. |
| 2016/0333230 | A1 | 11/2016 | Korthals et al. |
| 2019/0077997 | A1 | 3/2019 | Demarez et al. |
| 2019/0106601 | A1 | 4/2019 | Hanle et al. |
| 2019/0228885 | A1 | 7/2019 | Boecker et al. |
| 2020/0040237 | A1 | 2/2020 | Kopf et al. |

FOREIGN PATENT DOCUMENTS

| | | |
|---|---|---|
| DE | 3605192 A1 | 11/1986 |
| DE | 3803318 C2 | 8/1989 |
| DE | 3803318 A1 | 6/1990 |
| DE | 9400574 U1 | 4/1994 |
| DE | 19729161 A1 | 1/1999 |
| DE | 10151569 A1 | 4/2003 |
| DE | 10342858 A1 | 4/2005 |
| DE | 102004061144 B1 | 6/2006 |
| DE | 202004019761 U1 | 6/2006 |
| DE | 60304353 T2 | 12/2006 |
| DE | 10 2013 213 726 A1 | 1/2015 |
| DE | 102013213726 A1 | 1/2015 |
| DE | 102014109141 A1 | 12/2015 |
| DE | 102015108365 A1 | 12/2016 |
| DE | 10 2016 220166 A1 † | 4/2018 |
| DE | 102016220166 A1 | 4/2018 |
| DE | 102019103121 A1 | 8/2020 |
| EP | 0017986 A1 | 10/1980 |
| EP | 0017986 B1 | 12/1982 |
| EP | 0 071 212 B1 | 2/1983 |
| EP | 0 185 356 B1 | 6/1986 |
| EP | 0260553 A2 | 9/1987 |
| EP | 0326928 A1 | 8/1989 |
| EP | 0343330 A2 | 11/1989 |
| EP | 0542716 A1 | 5/1993 |
| EP | 0647691 B1 | 1/1994 |
| EP | 542716 B1 | 6/1997 |
| EP | 1448 744 B1 | 12/2005 |
| EP | 1 848 006 A2 | 10/2007 |
| EP | 1 378 527 B1 | 11/2008 |
| EP | 2 497 805 A1 | 9/2012 |
| EP | 2 520 627 A1 | 11/2012 |
| EP | 2 520 628 A1 | 11/2012 |
| EP | 2 520 629 A1 | 11/2012 |
| EP | 2 522 705 A1 | 11/2012 |
| EP | 2 695 926 A1 | 2/2014 |
| JP | H04181609 A | 6/1992 |
| JP | H04210182 A | 7/1992 |
| JP | H09206246 A | 11/1997 |
| JP | 2008226587 A | 9/2008 |
| JP | 2012142105 A | 7/2012 |
| JP | 2012248527 | 12/2012 |
| JP | 2014146506 A | 8/2014 |
| JP | 2016533000 A | 10/2016 |
| WO | 2012091173 A1 | 7/2012 |
| WO | 2013132570 A1 | 9/2013 |
| WO | 2015/004190 A1 | 1/2015 |
| WO | 2015004190 A1 | 1/2015 |
| WO | 2017021487 A1 | 2/2017 |
| WO | 2017/162737 A1 | 9/2017 |
| WO | 2017155441 A1 | 9/2017 |
| WO | 2017155442 A1 | 9/2017 |
| WO | 2017162737 A1 | 9/2017 |

OTHER PUBLICATIONS

EP Office Action issued in corresponding application EP 20156133.9 dated Jul. 10, 2020.
CN Office Action issued in corresponding application CN201811534791 dated Mar. 20, 2020.
Boerzel, "Acrodur: Die okologische Alternative zu duroplastischen Standard—Bindermitteln", Hofer Vliesstoffage, BASF, Nov. 10, 2005, pp. 1-23.
DE Patent Office Search Report for related application DE102019103121 dated Nov. 19, 2019.
Verschuerean, "Cycloaliphatic epoxide resins for cationic UV-cure", UCB Chemicals, 1999, pp. 269-288.
Related application DE 102019103121—DE Patent Office Search Report dated Nov. 19, 2019.
Bulut U., J. Polym., Sci., 2005; 43, pp. 3205-3220.
Related application DE 102019103123—DE Office Action dated Oct. 22, 2019.
Related application U.S. Appl. No. 16/785,847—Concise Statement of Relevance.

(56) References Cited

OTHER PUBLICATIONS

English translation of related application DE 102019103123—DE Patent Office Action dated Oct. 22, 2019.
Related application DE102019103124—DE Office Action dated Oct. 14, 2019.
English translation of related application DE 102019103124—DE Office Action dated Oct. 14, 2019.
Related application U.S. Appl. No. 16/785,348—Concise Statement of Relevance.
Related application EP 20156124—Concise Statement, EPO Search Report dated Jun. 26, 2020.
Related application EP 20156125—EP Search Report and EP Office Action dated Jul. 10, 2020.
English translation of related application EP 20156125 Search Report and Office Action dated Jul. 10, 2020.
Related application EP 20156127—EP SearchReport and OfficeAction dated Jul. 10, 2020.
English translation of related application EP 20156127—EP SearchReport and OfficeAction dated Jul. 10, 2020.
Related application EP 20156131—EP Search Report dated Jun. 24, 2020.
English translation of related application EP 20156131—EP Search Report dated Jun. 24, 2020.
Related application EP20156133—EP Examination Report dated Jul. 10, 2020.
English translation of related application EP 20156133—EP Examination Report dated Jul. 10, 2020.
Eastman, Technical Data Sheet, Regalite R1100 Hydrocarbon Resin, 2019, pp. 1-3.
Related application EP 3693433—EPO Search Report—excerpt, concise statement.
Simon, et al., "Gel permeationschromotographile (GPD) in der Polymeranalytik: Eine Kurze Einfuehrung", News Analytik, Mar. 28, 2013, pp. 1-5.
Related application U.S. Appl. No. 16/785,339—Third Party Submission and Concise Statements of Relevance.
Related application U.S. Appl. No. 16/785,348—Third Party Submission and Concise Statement of Relevance.
Related application U.S. Appl. No. 16/784,888—References cited in Third-Party Submission.
Kraton G1657M, techinical data sheet, Kraton Corp., 2019.
Related application U.S. Appl. No. 16/784,888—Third Party Submission and Concise Statements of Relevance.
Taghleef, Nativa: NTSS, Seiten, pp. 1-2, Nov. 26, 2018.
Concise Statement of Relevance for related application DE102019103120 dated Oct. 23, 2019.
Related application U.S. Appl. No. 16/785,339—Concise Statement of Relevance.
Related application U.S. Appl. No. 16/785,339—References Cited in Third Party Submission.
Related application U.S. Appl. No. 16/785,847—References Cited in Third Party Submission.
English Translation of DE Office Action for related application DE102019103120 dated Oct. 23, 2019.
DE Office Action for related application DE102019103120 dated Oct. 23, 2019.
Acrodur 950L technical datasheet, BASF.
Third Party Submission in related U.S. Appl. No. 16/785,348 dated Feb. 12, 2021.
Machine Translation of WO 2015004190A1 published Jan. 15, 2015.
Pages from German Patent Office Examination Report dated Oct. 22, 2019 (already on file).†
Pages from EP Search Report.†

\* cited by examiner
† cited by third party

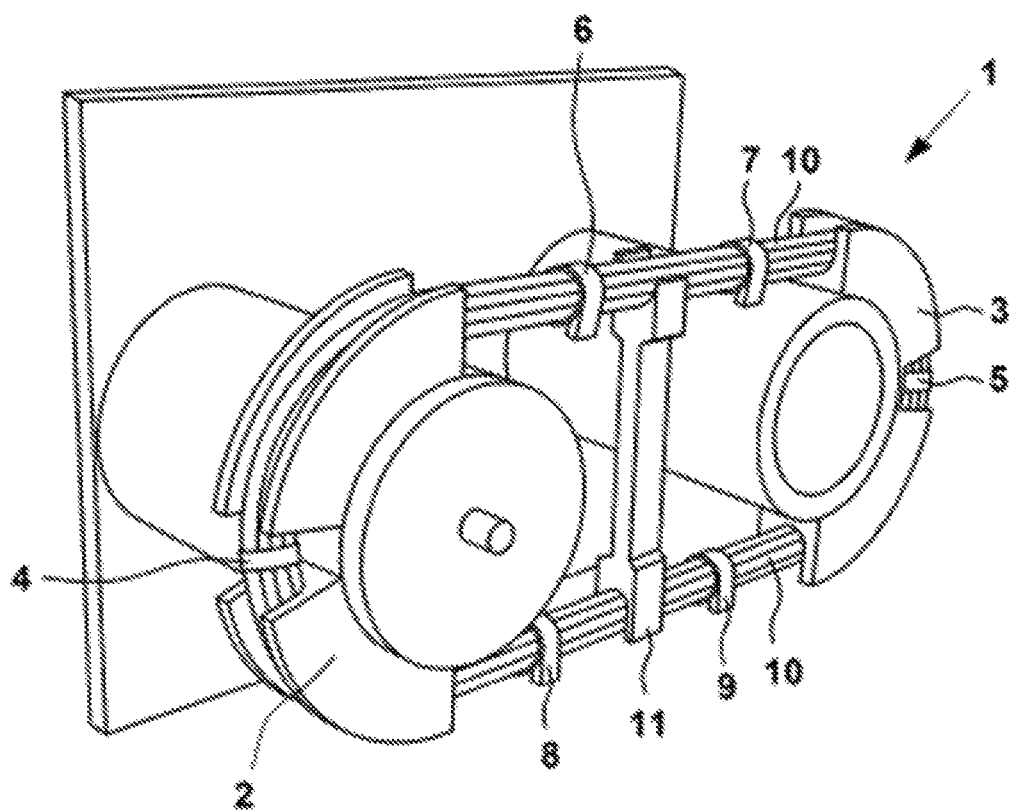

MOISTURE-CURABLE ADHESIVE TAPE AND METHOD FOR JACKETING ELONGATED ITEMS, ESPECIALLY LEADS

This application claims the benefit of priority to German Patent Application No. 10 2019 103 122.2, filed Feb. 8, 2019, the disclosures of which being incorporated herein by reference in their entirety.

The invention relates to an adhesive tape and to a method for jacketing elongated items, especially cable sets.

Adhesive tapes have long been used in industry for producing cable looms. The adhesive tapes are employed to bundle a multiplicity of electrical leads prior to installation or in an already assembled state, in order, for example, to reduce the space taken up by the bundle of leads, by bandaging them, and additionally to achieve protective functions such as protection from mechanical and/or thermal stressing. Common forms of adhesive tapes comprise film carriers or textile carriers, which in general are coated on one side with pressure sensitive adhesives. Adhesive tapes for the wrapping of elongated items are known from, for example, EP 1 848 006 A2, DE 10 2013 213 726 A1, and EP 2 497 805 A1.

The present cable sets swathed with adhesive tape are generally flexible. This flexibility is often undesirable, however, for technical reasons associated with manufacture. In manufacture, the cable harnesses are generally prefabricated to make up a cable plan, and then inserted into the object which is to be equipped-such as motor vehicles, for example. A cable set plan corresponds to the actual three-dimensional disposition of the individual cable harnesses in the cable set—that is, which cable harness is bent at which point in which angle, where positions of branches or outbindings are located, and with which connectors the ends of the cable harnesses are fitted.

In order to hold the individual harnesses of the cable set in a defined shape, allowing them to be guided around the engine in the engine compartment, for example, without coming into contact with the engine, it is usual to mount injection-moulded components subsequently around the cable loom swathed with adhesive tape. A disadvantage of these injection-moulded components, however, is that they entail additional material and additional assembly effort.

WO 2015/004190 A1 discloses a method for jacketing elongated items such as, more particularly, leads or cable sets, wherein the elongated item is wrapped with an adhesive tape, with curable adhesive applied thereon, in a helical line or in an axial direction, and the adhesive applied on the adhesive tape is cured by supply of radiant energy such as heat. For the thermal curing in that case a temperature of 175° C. is employed.

A disadvantage of that method is the high curing temperature, which is of little practicability in the assembly of cable harnesses during the manufacturing operation in the automotive industry, for example, especially since the cable insulation, which is often fabricated from PVC, may be damaged. Consequently, cable plans have to date been laid in prefabricated, injection-moulded shapes. This entails a high level of manufacturing effort.

Desirable adhesive tapes are therefore those which cure at 110° C. at most, preferably 100° C. at most, and more preferably at about room temperature, allowing the wrapping of adhesive tapes to be integrated into the operation of manufacturing the cable looms or cable plans. The adhesive tapes must after curing exhibit the required dimensional stability properties. Moreover, the adhesives must not cure during storage itself, since otherwise they are no longer usable. Lastly, curing is to take place within the cycle time of the production operation (around 6 minutes).

It is therefore an object of the present invention to provide an adhesive tape for jacketing elongated items that meets the requirements described above. Another object of the present invention is to provide a method for wrapping elongated items using the rigid adhesive tape of the invention, and also a product obtainable with the method.

Proposed as a solution to the technical problems is a method for jacketing an elongated item such as more particularly leads or cable sets, where a tape which comprises a moisture-curing binder on a carrier is first moistened with water and immediately thereafter is guided in a helical line around the elongated item or the elongated item is wrapped in an axial direction by the adhesive tape, the elongated item together with the adhesive tape wrapping is brought into the desired disposition, more particularly into the cable set plan, the elongated item is held in this disposition, while the binder cures.

Proposed alternatively as a solution to the technical problems is a method for jacketing an elongated item such as more particularly leads or cable sets, where a tape which comprises a moisture-curing binder on a carrier is guided in a helical line around the elongated item or the elongated item is wrapped in an axial direction by the adhesive tape, the elongated item together with the adhesive tape wrapping is brought into the desired disposition, more particularly into the cable set plan, the elongated item is held in this disposition, and the binder is brought to cure by the supply of moisture, e.g. steam, sprayed water misting or wrapping with a moist cloth.

According to one embodiment of the invention, the elongated item is a cable harness which comprises a bundle of a plurality of cables, such as 3 to 1000 cables, preferably 10 to 500 cables, more particularly between 50 and 300 cables.

Tapes which comprise moisture-curing binders are well known and are used for producing supportive dressings or stiff orthopaedic dressings.

Particularly preferred moisture-curable binders for use in the present invention are moisture-curable, isocyanate-functional prepolymers. Suitable systems of this type are disclosed for example in U.S. Pat. Nos. 4,131,114, 4,376,438, 4,433,680, 4,411,262, 4,433,680, 4,502,479, 4,667,661, 5,944,674 and 6,595,938.

The expression "moisture-curable, isocyanate-functional prepolymers" used here denotes a prepolymer derived from a polyisocyanate compound and from a compound or an oligomer containing reactive hydrogen (e.g. a "polyol"). A compound having reactive hydrogen is a compound with active hydrogen in accordance with the well-known Zerevitinov test, as described for example in Chemistry of Organic Compounds by Carl R. Noller, Chapter 6, pp. 121-122 (1957). The prepolymer has sufficient isocyanate functions to cure on exposure to water, e.g. steam or, preferably, liquid water.

According to one embodiment of the present invention, the moisture-curable binders comprise NCO prepolymers which contain free isocyanate groups and are based on aromatic polyisocyanates and polyols containing tertiary amine nitrogen. The prepolymers preferably have an NCO content of 5 to 30 wt % and a tertiary amine nitrogen content of 0.05 to 2.5 wt %, as described in DE 2651089 A1, which is hereby fully incorporated by reference.

Isocyanates suitable in the invention are, for example, toluene 2,4-diisocyanate, toluene 2,6-diisocyanate and mixtures of these isomers; diphenylmethane 4,4'-diisocyanate; diphenylmethane 2,4'-diisocyanate and possible mixtures of these isomers with diphenylmethane 2,2'-diisocyanate; aromatic polyisocyanates and their mixtures. Suitable aromatic polyisocyanates are derived, for example, from the phosgenation of the condensation product of aniline and formaldehyde. Used with preference is an isocyanate of low volatility such as diphenylmethane diisocyanate (MDI). The suitable commercially available isocyanate starting materials include ISONATE 2143L (available from Dow Chemical Co.), MONDUR MRS (Mobay Chem. Co., Pittsburgh, Pa.) and PAPI (Dow Chemical Co.).

Polyols suitable in the invention are, for example, polyalkylene oxides (e.g. polyethylene oxide and polybutylene oxide), polypropylene ether glycols (available from Arco Chemical under the trade name Arcol PPG and from BASF Wyandotte under the trade name Pluracol), polytetramethylene ether glycols (e.g. Polymeg from Quaker Oats Co. or Terathane from E.I. Du Pont de Nemours Co., Wilmington, Del.), polycapro-lactone diols (e.g. Tone polyol series from Union Carbide) and also polyester polyols (e.g. hydroxy-terminated polyesters obtained by esterification of dicarboxylic acids and diols; such as the Rucoflex polyols, which are available from Ruco Division, Hooker Chemical Co.). By using polyols of low molecular mass it is possible to increase the stiffness of the cured resin, in general.

An example of a binder suitable in the invention comprises an isocyanate which is known as Isonate™ 2143L and is available from the Dow Chemical Company, and a polypropylene oxide polyol which is available from Arco Chemical and is known as Arcol PPG725. To increase the storage stability of the material, it contains preferably 0.01 to 1.0 wt % of benzoyl chloride or another suitable stabilizer (based on the total weight of the resin).

With regard to the moisture-curable binders particularly preferred in the invention, reference is made more particularly to the content of U.S. Pat. No. 6,595,938.

As carriers it is possible to use all known sheets and textile carriers such as drawn-loop knits, laid scrims, tapes, braids, needle pile textiles, felts, wovens (comprising plain, twill and satin weaves), formed-loop knits (comprising warp-knitted fabric and knitwear fabric) or nonwovens, where "nonwoven" is to be understood as meaning at least textile sheetlike structures according to EN 29092 (1988) and also stitchbonded webs and similar systems. Particularly advantageous is an adhesive tape in which the carrier used is a woven, a nonwoven or a formed-loop knit. Carriers of these kinds are described for example in WO 2015/004190 A1, hereby referenced in its entirety.

A further possibility is to use spacer fabrics formed by weaving or formed-loop knitting, with lamination. Woven spacer fabrics of this kind are disclosed in EP 0 071 212 B1. Woven spacer fabrics are matt-shaped layered elements with a top layer comprising a fibre or filament web, a bottom layer and, between these layers, individual or bushels of holding fibres needled through the particle layer in a distributed form across the area of the layered element, and the top and bottom layers joined to one another.

Particularly suitable nonwoven fabrics are consolidated staple fibre webs, but also filament webs, meltblown webs and spunbonded webs, which usually require additional consolidation. Possible methods of consolidation known for webs are mechanical, thermal and chemical consolidation.

Having proven to be particularly advantageous are webs consolidated in particular by overstitching with separate threads or by interlooping. Consolidated webs of these kinds are produced for example on stitchbonding machines of the "Malimo" type from Karl Mayer, formerly Malimo, and can be purchased from companies including Hoftex Group AG.

The carrier used may additionally be a Kunit or Multiknit web. A Kunit web is characterized in that it originates from the processing of a longitudinally oriented fibre web to form a sheetlike structure which has loops on one side and, on the other side, loop feet or pile fibre folds, but possesses neither threads nor prefabricated sheetlike structures. A nonwoven web of this kind as well has already been produced for some considerable time on stitchbonding machines of the "Malimo" type from Karl Mayer, for example.

A Multiknit web is characterized relative to the Kunit web in that the web experiences consolidation on both the top and bottom sides by virtue of the double-sided needle punching. Serving in general as a starting product for a Multiknit are one or two single-sidedly interlooped pile fibre stitchbonded fabrics produced by the Kunit process. In the end product, the two facing sides of the fabric are shaped by fibre interlooping to form a closed surface, and are joined to one another by fibres which stand almost perpendicular. It is possible additionally to incorporate further punchable sheetlike structures and/or scatterable media.

Also suitable, lastly, are stitchbonded nonwovens as a precursor to the formation of a carrier of the invention and an adhesive tape of the invention. A stitchbonded nonwoven is formed from a nonwoven web material having a large number of mutually parallel seams. These seams are formed by the stitched or knitted incorporation of continuous textile threads. For this type of nonwoven web, stitchbonding machines of the "Malimo" type from Karl Mayer are known.

Also particularly suitable are needle felt webs. In a needle felt, a fibre web is converted into a sheetlike structure by means of barbed needles. The needles are alternatingly punched into and pulled out of the material in order to consolidate it on a needle beam, with the individual fibres becoming entangled to form a firm sheetlike structure.

Additionally particularly advantageous is a staple fibre web, which in a first step is preconsolidated by mechanical working or which is a wet-laid web laid hydrodynamically, where between 2 wt % and 50 wt % of the fibres of the web are fusible fibres, more particularly between 5 wt % and 40 wt % of the fibres in the web. A nonwoven web of this kind is characterized in that the fibres are laid wet or, for example, a staple fibre web is preconsolidated by the formation of loops from fibres of the web, by needling, stitching, air and/or water jet processing. A second step is that of heat setting, where the strength of the web is further increased by the complete or partial melting of the fusible fibres.

Advantageously and at least regionally, the carrier has a single-sidedly or double-sidedly polished surface, preferably in each case a fully polished surface. The polished surface may be chintzed, as explained in EP 1 448 744 A1, for example. This enhances the dirt repellency.

Starting materials intended for the carrier are in particular (manmade) fibres (staple fibre or continuous filament) made from synthetic polymers, also called synthetic fibres, of polyester such as polyethylene terephthalate, polyamide, polyimide, aramid, polyolefin, polyacrylonitrile or glass, (manmade) fibres formed from natural polymers such as cellulosic fibres (viscose, Modal, lyocell, cupro, acetate, triacetate, cellulon), such as rubber fibres, such as plant protein fibres and/or such as animal protein fibres and/or natural fibres of cotton, sisal, flax, silk, hemp, linen, coconut or wool. The present invention, however, is not confined to the materials stated; instead, recognizably for the skilled person with no inventive step required, it is possible to use a large number of further fibres to produce the nonwoven web.

Likewise suitable, furthermore, are yarns fabricated from the raw materials stated. In the case of woven fabrics or laid scrims, individual threads may be produced from a blended yarn, and thus may have synthetic and natural constituents. Generally speaking, however, the warp threads and the weft threads are each formed of a pure variety of yarn.

Polyester is used with preference as a material for the carrier, owing to the outstanding ageing resistance and the outstanding media resistance with respect to chemicals and service fluids such as oil, petrol, antifreeze and the like. A further advantage of the polyester is that of leading to a highly abrasion-resistant and temperature-stable carrier, this being particularly important for the specific end use for the bundling of cables in motor vehicles and, for example, in the engine compartment.

According to a further embodiment of the invention, a laid glass-fibre scrim is used as the carrier.

The basis weight of the textile carrier is advantageously between 30 g/m$^2$ and 300 g/m$^2$, more advantageously between 50 g/m$^2$ and 200 g/m$^2$, particularly advantageously between 50 g/m$^2$ and 150 g/m$^2$, very advantageously between 70 g/m$^2$ and 130 g/m$^2$.

According to one particularly advantageous embodiment of the invention, carriers used comprise a woven or nonwoven fabric made of polyester, and have a basis weight of between 50 g/m$^2$ and 150 g/m$^2$.

The coat weight of the binder applied to and/or introduced into the carrier is advantageously between 30 g/m$^2$ and 300 g/m$^2$, more advantageously between 40 g/m$^2$ and 200 g/m$^2$, particularly advantageously between 50 g/m$^2$ and 130 g/m$^2$.

Introduction into the carrier, especially into a nonwoven or woven carrier, may be accomplished, for example, by impregnating the carrier with the UV-curable composition.

According to one embodiment of the invention, the tape additionally further comprises a pressure sensitive adhesive in addition to the binder that cures on contact with moisture.

The adhesive is a pressure sensitive adhesive (PSA), in other words an adhesive which even under relatively weak applied pressure allows durable bonding to virtually all substrates and which after use can be detached from the substrate again substantially without residue. A PSA has a permanent pressure-sensitive tack at room temperature, thus possessing sufficiently low viscosity and a high touch stickiness, and so it wets the surface of the bonding substrate in question even at low applied pressure. The bondability of the adhesive derives from its adhesive properties, and the redetachability from its cohesive properties.

The adhesive may after curing be elastic, so as to ensure a long-lasting jacketing which is insensitive to vibration and twisting.

Preferred PSAs are those as described in published European patent applications EP 2 520 627 A1, EP 2 522 705 A1, EP 2 520 628 A1, EP 2 695 926 A1, EP 2 520 629 A1 and EP 3 433 330 A1, incorporated here by reference.

In accordance with the invention, the adhesive used is a structural adhesive (construction adhesive, assembly adhesive) (see Römpp, Georg Thieme Verlag, document coding RD-19-04489, last update: September2012). According to DIN EN 923: 2006-01, structural adhesives are adhesives forming bonds capable of sustaining in a structure a specified strength for a defined longer period of time (according to the ASTM definition: "bonding agents used for transferring required loads between adherends exposed to service environments typical for the structure involved"). They are therefore adhesives for bonds which are highly robust both chemically and physically, and in the cured state they contribute to strengthening the bonded substrates and are used for producing structures made from metals, ceramic, concrete, wood or reinforced plastics. The structural adhesives of the invention are based in particular on reactive adhesives (phenolic resins, epoxy resins, polyimides, polyurethanes and others).

According to one first embodiment the PSA is in the form of a dried polymer dispersion, and the polymer being composed of: 5 to 25 wt %, preferably 10 to 22 wt % of ethylene, 30 to 69 wt %, preferably 40 to 60 wt %, of alkyl acrylate esters with $C_4$ to $C_{12}$ alkyl radicals, 20 to 55 wt %, preferably 28 to 38 wt %, of vinyl acetate, 0 to 10 wt % of other ethylenically unsaturated compounds, and the PSA contains between 15 and 100 parts by weight of a tackifier (based on the mass of the dried polymer dispersion), as described in EP 2 520 627 A1. Preferably the alkyl acrylate ester is n-butyl acrylate and/or 2-ethylhexyl acrylate. Other ethylenically unsaturated compounds encompass alkyl (meth)acrylates, preferably $C_1$ to $C_{20}$ alkyl (meth)acrylates with the exception of the monomers forming the alkyl acrylate esters with $C_4$ to $C_{12}$ alkyl radicals; aromatic vinyl monomers such as styrene, α-methylstyrene and vinyltoluene, $C_1$ to $C_{10}$ hydroxyalkyl (meth)acrylates such as, in particular, hydroxyethyl or hydroxypropyl (meth)acrylate, vinyl esters of carboxylic acids containing up to 20 carbon atoms, such as vinyl laurate, vinyl ethers of alcohols containing up to 10 carbon atoms, such as vinyl methyl ether or vinyl isobutyl ether, vinyl halides such as vinyl chloride or vinylidene dichloride, acid amides such as acrylamide or metacrylamide, and unsaturated hydrocarbons having 3 to 8 carbon atoms such as propene, butadiene, isoprene, 1-hexene or 1-octene, or mixtures thereof. A further monomer which may be added to the polymer advantageously is a monomer having a functionality of two or more, added preferably at 0 to 2 wt % and more preferably at 0 to 1 wt %. Examples of polyfunctional ethylenically unsaturated monomers (e) are divinylbenzene, alkyl diacrylates such as 1,2-ethylene glycol diacrylate, 1,4-butanediol diacrylate, 1,6-hexanediol diacrylate, 1,8-octanediol diacrylate or 1,12-dodecanediol diacrylate, triacrylates such as trimethylolpropane triacrylate and tetraacrylates such as pentaerythritol tetraacrylate. The polymer dispersion is prepared by the process of emulsion polymerization of the stated components. Particularly preferred embodiments and extensive descriptions of the ingredients and also of the preparation processes are found in EP 0 017 986 B1 and also EP 0 185 356 B1.

According to one further embodiment, the PSA is in the form of a dried polymer dispersion, the polymer being composed of: (a) 90 to 99 wt % of n-butyl acrylate and/or 2-ethylhexyl acrylate, preferably 2-ethylhexyl acrylate, (b) 0 to 10 wt % of an ethylenically unsaturated monomer having an acid or acid anhydride function, (c) 10 to 1 wt % of one or more ethylenically unsaturated monofunctional monomers different from (a) and (b), such as acrylonitrile and/or metacrylonitrile, (d) 0 to 1 wt % of a monomer having a functionality of two or more, and the PSA contains between 15 and 100 parts by weight of a tackifier (based on the mass of the dried polymer dispersion), as described in EP 2 522 705 A1. One particularly preferred embodiment of the invention thus encompasses a mixture of 2-ethylhexyl acrylate as monomer (a) and acrylonitrile as monomer (c). Contemplated advantageously as monomer (b) is, for example, acrylic acid, methacrylic acid, itaconic acid, maleic acid, fumaric acid and/or maleic anhydride. Preference is given to acrylic acid or methacrylic acid, optionally the mixture of both. Examples of polyfunctional ethylenically unsaturated monomers (d) are divinylbenzene, alkyl diacrylates such as 1,2-ethylene glycol diacrylate, 1,4-butanediol diacrylate, 1,6-hexanediol diacrylate, 1,8-octanediol diacrylate or 1,12-dodecanediol diacrylate, triacrylates such as trimethylolpropane triacrylate and tetraacrylates such as pentaerythritol tetraacrylate. The polymer dispersion is produced by the process of emulsion polymerization of the stated components. Descriptions of this process are described—given for example—in EP 1 378 527 B1.

According to one further embodiment, the PSA is in the form of a dried polymer dispersion, the polymer being composed of: (a) 40 to 90 wt % of n-butyl acrylate and/or 2-ethylhexyl acrylate, preferably (b) 2-ethylhexyl acrylate, 0 to 10 wt % of an ethylenically unsaturated monomer having an acid or acid-anhydride function, (c) 60 to 10 wt % of one or more ethylenically unsaturated monofunctional monomers different from (a) and (b), (d) 0 to 1 wt % of a monomer having a functionality of two or more, and the PSA contains between 15 and 100 parts by weight of a tackifier (based on the mass of the dried polymer dispersion) as described in EP 2 520 628 A1. Contemplated advantageously as monomer (b) is, for example, acrylic acid, methacrylic acid, itaconic acid, maleic acid, fumaric acid and/or maleic anhydride. Preference is given to acrylic acid or methacrylic acid, optionally the mixture of both. Monomers (c) include alkyl (meth)acrylates, preferably $C_1$ to $C_{20}$ alkyl (meth)acrylates with the exception of the monomers forming (a); aromatic vinyl monomers such as styrene, α-methylstyrene and vinyltoluene, $C_1$ to $C_{10}$ hydroxyalkyl (meth)acrylates such as, in particular, hydroxyethyl or hydroxypropyl (meth)acrylate, vinyl esters of carboxylic acids containing up to 20 carbon atoms, such as vinyl acetate or vinyl laurate, vinyl ethers of alcohols containing up to 10 carbon atoms, such as vinyl methyl ether or vinyl isobutyl ether, vinyl halides such as vinyl chloride or vinylidene dichloride, acid amides such as acrylamide or methacrylamide, and unsaturated hydrocarbons having 2 to 8 carbon atoms such as ethylene, propene, butadiene, isoprene, 1-hexene or 1-octene. Ethyl acrylate is particularly preferred in the invention. Examples of polyfunctional ethylenically unsaturated monomers (d) are divinylbenzene, alkyl diacrylates such as 1,2-ethylene glycol diacrylate, 1,4-butanediol diacrylate, 1,6-hexanediol diacrylate, 1,8-octanediol diacrylate or 1,12-dodecanediol diacrylate, triacrylates such as trimethylolpropane triacrylate and tetraacrylates such as pentaerythritol tetraacrylate. The polymer dispersion is prepared by the process of emulsion polymerization of the stated components. Descriptions of this process are described, given for example, in EP 1 378 527 B1.

According to one further embodiment the PSA is in the form of a dried and electron beam (EBC) crosslinked polymeric acrylate dispersion, especially in aqueous acrylate dispersion, preferably having a gel value of greater than or equal to 40%, determined by Soxhlet extraction, where the polymeric acrylate dispersion comprises polymers composed of (a) monomeric acrylates and optionally (b) ethylenically unsaturated comonomers which are not acrylates, with the PSA containing between 15 and 100 parts by weight of a tackifier (based on the mass of the dried polymeric dispersion) as described in EP 2 695 926 A1.

According to one further embodiment, the PSA has a shear viscosity at a temperature of 25° C. during coating from dispersion of 200 to 100 000 Pa·s at a shear rate of $10^{-2}$ $s^{-1}$ and 0.1 to 10 Pa·s at a shear rate of 100 $s^{-1}$. The PSA consists preferably of an aqueous acrylate dispersion, in other words a polyacrylic ester in fine dispersion in water and having pressure-sensitive adhesive properties, as are described for example in the Handbook of Pressure Sensitive Technology by D. Satas. Acrylate PSAs are typically radically polymerized copolymers of alkyl acrylates or alkyl methacrylates of $C_1$ to $C_{20}$ alcohols such as, for example, methyl acrylate, ethyl (meth)acrylate, n-butyl (meth)acrylate, t-butyl (meth) acrylate, cyclohexyl (meth) acrylate, 2-ethylhexyl (meth)acrylate, n-octyl (meth)acrylate, isooctyl (meth)acrylate, n-decyl (meth)acrylate, n-dodecyl (meth)acrylate, tetradecyl (meth)acrylate, lauryl (meth)acrylate, oleyl (meth)acrylate, palmityl (meth)acrylate and stearyl (meth)acrylate as well as further (meth)acrylic esters such as isobornyl (meth)acrylate, benzyl (meth)acrylate, phenyl (meth)acrylate and 2-bromoethyl (meth)acrylate, alkoxyalkyl (meth)acrylates such as ethoxyethyl (meth)acrylate. Further included are esters of ethylenically unsaturated dicarboxylic and tricarboxylic acids and anhydrides, such as ethyl maleate, dimethyl fumarate and ethyl methyl itaconate. Likewise included are vinylaromatic monomers such as, for example, styrene, vinyltoluene, methylstyrene, n-butylstyrene, decylstyrene, as described in EP 2 520 629 A1.

According to one further embodiment the PSA is in the form of a dried polymer dispersion, the polymer being composed of: (a) 95.0 to 100.0 wt % of n-butyl acrylate and/or 2-ethylhexyl acrylate and (b) 0.0 to 5.0 wt % of an ethylenically unsaturated monomer having an acid or acid-anhydride function, as described in EP 2 433 330 A1. Preferably the polymer consists of 95.0 to 99.5 wt % of n-butyl acrylate and/or 2-ethylhexyl acrylate and 0.5 to 5 wt % of an ethylenically unsaturated monomer having an acid or acid-anhydride function, more preferably of 98.0 to 99.0 wt % of n-butyl acrylate and/or 2-ethylhexyl acrylate and 1.0 to 2.0 wt % of an ethylenically unsaturated monomer having an acid or acid-anhydride function. Besides the acrylate polymers recited, the PSA may additionally be admixed, as well as any residual monomers present, with the tackifiers mentioned later on below and/or with adjuvants such as light stabilizers or ageing inhibitors, in the quantities likewise stated below. In particular there are no further polymers such as elastomers in the PSA, meaning that the polymers of the PSA consist only of the monomers (a) and (b) in the specified proportions.

According to one further embodiment the PSA is in the form of a dried polymer dispersion, the polymer being composed of: (a) 97.0 to 98.0 wt % of n-butyl acrylate and/or 2-ethylhexyl acrylate, (b) 2.0 to 3.0 wt % of an ethylenically unsaturated monomer having an acid or acid-anhydride function. Preferably the polymer consists of 97.2 to 97.7 wt % of n-butyl acrylate and/or 2-ethylhexyl acrylate, more preferably n-butyl acrylate, and 2.3 to 2.8 wt % of an ethylenically unsaturated monomer having an acid or acid-anhydride function. Contemplated advantageously as monomer (b) is, for example, acrylic acid, methacrylic acid, itaconic acid, maleic acid, fumaric acid and/or maleic anhydride.

According to one further embodiment, the PSAs are crosslinker-free. "Crosslinker-free" in the sense of this invention means that no compounds capable of crosslinking are added to the PSA. As used here, the term "crosslinker" represents chemical compounds which are capable of connecting molecular chains to one another so that the two-dimensional structures are able to form intermolecular bridges and hence three-dimensionally crosslinked structures. Crosslinkers are those compounds-especially difunctional or polyfunctional and usually of low molecular mass, that under the chosen crosslinking conditions are able to react with suitable groups-especially functional groups-of the polymers to be crosslinked, and therefore link two or more polymers or polymer positions to one another (form "bridges") and hence create a network of the polymer or polymers to be crosslinked. As a result there is generally an increase in the cohesion. Typical examples of crosslinkers are chemical compounds which within the molecule or at the two ends of the molecule have two or more identical or different functional groups and are therefore able to crosslink molecules with similar or else different structures to one another. Moreover, a crosslinker is able to react with the reactive monomer or reactive resin, as defined above, without an accompanying polymerization reaction in the actual sense. The reason is that, in contrast to the activator, as described above, a crosslinker can be built into the polymer network.

The coat weight of the adhesive applied to the carrier is advantageously between 30 g/m² and 300 g/m², more advantageously between 40 g/m² and 200 g/m², particularly advantageously between 50 g/m² and 130 g/m².

The tape is preferably wrapped spirally around the elongated item with an overlap of 30% to 70%, more preferably 40 to 50%, more particularly about 50%.

Lastly, the present invention also pertains to a cable harness jacketed with the cured adhesive tape of the invention, and to a cable harness produced by the method of the invention.

EXAMPLES

Example 1-Bending Test for Ascertaining the Stiffness

A test specimen consisting of 250 individual leads with a lead cross section of 0.35 mm² was bundled using 5 cm wide 3M Soft Cast Casting tape to form a specimen lead set, and so the specimen lead set had a diameter of 23±5 mm and a length of 300±50 mm. This specimen lead set was wrapped spirally with the 3M Soft Cast Casting tape, and an overlap of 50% was ensured. The stiffening material was subsequently cured using steam. The wetting time was between 20 and 30 seconds. Around 3 min after activation, the final strength was attained and the specimen could be tested.

The cured specimen lead set was subjected to a bending test in order to determine the influence of the stiffening material on the stiffness. The bending test was performed on a tensile testing machine. For this test, the specimen lead set was placed onto two jaws with a spacing of 70 mm and pressed in centrally with a crosshead by a distance of 30 mm and loaded. The force required for the deformation of the measurement travel was recorded by a tensile testing machine in newtons. The testing velocity was 100 mm/min, both during loading and during unloading of the specimen lead set. The test was carried out at three different points on the lead set (start, middle and end). The bending force results from the mean value of the three individual measurements, and was evaluated in three categories as follows:

Evaluation Categories, Three-Point Bending Test

| | |
|---|---|
| + | highly suitable for the application (500-750N) |
| o | of limited suitability for the application (400-500N and 700-800N) |
| − | not suitable for the application (<400 and >800N) |

For comparison, a commercially available adhesive tape, tesa® 51036, was subjected to the same test. The results are set out in table 1 hereinafter.

Example 2-C-shape Testing for Determining the Stiffness at Different Temperatures For ascertaining the stiffness of a bent cable specimen, a test method was developed (C-cable specimen bending test).

To produce a C-cable specimen (see FIG. 1) a cable lead (10) with a lead cross section of 0.35 mm² is wound 100 times around a mount (1) to form a specimen lead set. The mount (1) has two opposite, semi-circular guides (2, 3) with a diameter of 120 mm, which are spaced apart with a spacing (A) of about 210 mm. The wound cable set is represented in FIG. 1.

The number of cable turns is 100. The resulting specimen lead set has a diameter of 15±5 mm and a perimeter of 690 mm. At the apices of the semicircle segments and at two linear sections (legs) in each case, the cable bundle (10) is tied together and fixed using cable ties (4, 5, 6, 7, 8, 9) with a tensile force of 210±10 N, so that after removal from the mount the cable bundle (10) possesses sufficient stiffness not to deform. To further improve the stiffness of the cable bundle (10), a support (11) is positioned between the legs of the cable bundle and is fixed likewise using cable ties.

The cable bundle (10) thus produced is removed from the mount and wrapped, with a 50% overlap, with the adhesive tape under test (width 19 mm-20 mm). Wrapping for this purpose is commenced at a cable tie (e.g. (6) or (7)) of the leg in the circle segment direction ((6)->(4) or (7)->(5)). When the wrapping reaches the cable tie (4) or (5) at the apex of the semicircle segment, the tie is removed and the winding is continued up to the next cable tie ((4)->(8) or (5)->(9)) of the opposite leg. Exactly the same procedure is carried out on the other side, on the other semicircle segment.

The specimens thus prepared undergo the corresponding crosslinking method (spraying with steam). Using wire cutters, the specimens are cut adjacent to the remaining cable ties, to give two "C-shaped" cable specimens (C-cable specimens), which each also have an unwrapped section on both sides of the semi-circular wrapped section. The cut is made at the distance of the diameter (120 mm) from the apex of the semicircle segment, projected onto the circle centre.

With one piece of cable respectively, loops are tied to the leg ends of the specimens, allowing the specimen to be hung up at one end and allowing a weight to be hung on at the other end. The remaining cable ties are now removed, since they can distort the result of testing. The distance between the legs is now determined.

One of the two specimens is stored at room temperature and the other at 60° C.

A 1 kg weight is hung from the respective lower leg of the "C-test specimen". After an hour the deflection of the cable bundle is recorded (deflection behaviour with 1 h at RT and 60° C.) and the weight is removed. After one minute the deflection is determined again (resilience behaviour 1 min at RT or 60° C.). After an hour, the deflection is then determined again and recorded (resilience behaviour 1 h at RT or 60° C.)

The values ascertained for the C-shape deformation were graded into three categories: highly suitable for the application, of limited suitability for the application, and unsuitable for the application. The categories were evaluated as follows:

Evaluation Categories, C-shape Bending Test (Room Temperature)

| | |
|---|---|
| + | highly suitable for the application (<15% deflection) |
| o | of limited suitability for the application (>15-30%) |
| − | unsuitable for the application (>30%) |

Evaluation Categories, C-shape Bending Test (60° C.)

| | |
|---|---|
| + | highly suitable for the application (<25% deflection) |
| o | of limited suitability for the application (>25-40%) |
| − | unsuitable for the application (>40%) |

Evaluation Categories, C-shape Bending Test (Resilience Behaviour at RT and 60° C.)

| | |
|---|---|
| + | highly suitable for the application (<10% deflection) |
| o | of limited suitability for the application (10-30%) |
| − | unsuitable for the application (>30%) |

For comparison a commercially available adhesive tape, tesa® 51036, was subjected to the same test. The results are likewise set out in table 1 hereinafter.

TABLE 1

| | 3-point bending test | C-shape deformation at RT | C-shape resilience behaviour at RT |
|---|---|---|---|
| Tape of the invention | + | + | + |
| tesa ® 51036 | − | − | − |

| | C-shape deformation at 60° C. | C-shape resilience behaviour at 60° C. |
|---|---|---|
| Tape of the invention | + | + |
| tesa ® 51036 | − | − |

Key:
+ highly suitable for the application
o of limited suitability for the application
− unsuitable for the application

The invention claimed is:

1. A method for jacketing leads or cable sets, where a tape which comprises a moisture-curing binder on a carrier is first moistened with water and immediately thereafter is guided in a helical line around the leads or cable sets or the leads or cable sets are wrapped in an axial direction by the adhesive tape, the leads or cable sets together with the adhesive tape is brought into the desired disposition, the leads or cable sets are held in this disposition while the moisture-curing binder cures, whereby the moisture-curable binder comprise NCO prepolymers which contain free isocyanate groups and are based on aromatic polyisocyanates and polyols containing tertiary amine nitrogen, forming a cured adhesive tape.

2. The method according to claim 1, wherein the moisture-curing binder is brought to cure by the supply of water.

3. The method according to claim 2, wherein the water is supplied as steam.

4. The method according to claim 2, wherein the carrier material comprises a polyester nonwoven or a laid glass-fibre scrim.

5. The method according to claim 1, wherein the tape is wound spirally around the elongated item with an overlap of 30% to 70%.

6. The method according to claim 1, wherein the tape is wound spirally around the elongated item with an overlap of 40% to 60%.

7. The method according to claim 1, wherein the tape additionally comprises a pressure sensitive adhesive.

8. The method according to claim 1, wherein the carrier comprises a polyester nonwoven or a laid glass-fibre scrim.

9. The method of claim 1, wherein the tape is wound spirally around the elongated item with an overlap of 30% to 70%.

10. The method of claim 1 wherein the cured adhesive tape is solely used in wrapping the leads or cable sets in forming a wire harness.

11. The method of claim 1 wherein the cured adhesive tape is used over substantially the whole length of the leads or cable sets in forming a wire harness.

\* \* \* \* \*